US010074112B2

(12) United States Patent
Wilson et al.

(10) Patent No.: US 10,074,112 B2
(45) Date of Patent: Sep. 11, 2018

(54) GUIDED UNIT-SPECIFIC AUTOMOBILE DEMONSTRATION

(71) Applicant: Nissan North America, Inc., Franklin, TN (US)

(72) Inventors: Matthew D. Wilson, Brentwood, TN (US); Jonathan M. Finkel, Franklin, TN (US)

(73) Assignee: Nissan North America, Inc., Franklin, TN (US)

( * ) Notice: Subject to any disclaimer, the term of this patent is extended or adjusted under 35 U.S.C. 154(b) by 406 days.

(21) Appl. No.: 14/745,605

(22) Filed: Jun. 22, 2015

(65) Prior Publication Data

US 2016/0371759 A1 Dec. 22, 2016

(51) Int. Cl.
*G06Q 30/02* (2012.01)
*G06Q 30/06* (2012.01)

(52) U.S. Cl.
CPC ..... *G06Q 30/0281* (2013.01); *G06Q 30/0623* (2013.01); *G06Q 30/0627* (2013.01); *G06Q 30/0639* (2013.01); *G06Q 30/0641* (2013.01)

(58) Field of Classification Search
CPC .......... G06Q 30/0623; G06Q 30/0281; G06Q 30/0627; G06Q 30/0641; G06Q 30/0639
See application file for complete search history.

(56) References Cited

U.S. PATENT DOCUMENTS

| 6,349,337 | B1* | 2/2002 | Parsons, Jr. | ........... G06F 9/4443 709/227 |
| 8,121,784 | B2 | 2/2012 | Templeton et al. | |
| 8,892,297 | B2 | 11/2014 | Inbarajan | |
| 9,165,319 | B1* | 10/2015 | Henry | ................. G06Q 30/0623 |
| 2002/0184062 | A1* | 12/2002 | Diaz | ...................... G06Q 10/06 705/7.15 |
| 2011/0191203 | A1* | 8/2011 | Hughes | .............. G06Q 30/0643 705/26.5 |
| 2013/0138467 | A1 | 5/2013 | Small et al. | |
| 2013/0157647 | A1* | 6/2013 | Kolodziej | ......... H04M 1/72522 455/419 |

(Continued)

FOREIGN PATENT DOCUMENTS

CN 103310316 A 9/2013

OTHER PUBLICATIONS

Kokemuller, Auto Porter Job Description, http://work.chron.com/auto-porter-job-description-24171.html, Archived Oct. 8, 2014. p. 1.*

(Continued)

*Primary Examiner* — William J Allen
*Assistant Examiner* — Maria S. P. Heath
(74) *Attorney, Agent, or Firm* — Young Basile Hanlon & MacFarlane, P.C.

(57) ABSTRACT

A computer-implemented system includes one or more mobile computers, a server, and digital data storage accessible by the server. The storage includes records describing automobiles in an inventory, such as vehicle identification numbers (VINs) referenced to automobile site availability and specific automotive features from a set of available automotive features. The mobile computer is programmed to perform machine-executable operations to present a guided, interactive automobile specific demonstration checklist.

18 Claims, 6 Drawing Sheets

(56) References Cited

U.S. PATENT DOCUMENTS

| | | | | |
|---|---|---|---|---|
| 2013/0208103 A1* | 8/2013 | Sands | ............... | G06F 21/31 |
| | | | | 348/78 |
| 2015/0093722 A1* | 4/2015 | Fitzgerald | ............ | G09B 9/04 |
| | | | | 434/62 |
| 2015/0120489 A1* | 4/2015 | Edelman | ......... | G06Q 30/0611 |
| | | | | 705/26.4 |
| 2016/0171599 A1* | 6/2016 | Bray | ............... | G06Q 30/08 |
| | | | | 705/26.3 |

OTHER PUBLICATIONS

Formconnection, Jan. 2014, available at http://www.formconnections.com/car-dealer-plans-formconnect/.

"Canvas Vehicle Quality Delivery Checklist Mobile App" Sep. 2013. https://www.youtube.com/watch?v=Bw27N81Uswo.

* cited by examiner

GUIDED UNIT-SPECIFIC AUTOMOBILE DEMONSTRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates in general to techniques and systems for demonstrating an automobile to a customer, and more particularly, for a techniques and systems to conduct a guided, interactive, in-person demonstration of an automobile, customized to the unit-specific features of that automobile.

BACKGROUND

Certainly, one of the best ways to gain knowledge about a given automobile is to set eyes upon the automobile, explore the various features in person, and take a test drive. This experience is sometimes referred to as an automobile "demonstration."

The content of a typical automobile demonstration rests heavily on the shoulders of a knowledgeable advisor, who is usually employed by an automobile dealership. Advisors, however, can vary in their depth of experience and product knowledge. Therefore, the experiences of different customers can vary from advisor to advisor, and from dealership to dealership.

To help promote greater the consistency of customer experiences, most automobile manufacturers provide standardized source materials such as product information literature and web pages. Although this approach may be satisfactory for some purposes, like any program, there is always room for improvement. The difficult question, subject to numerous creative, technical, and administrative challenges, is how to envision and actually carry out such improvements.

SUMMARY

Disclosed herein are aspects of a computer-implemented system including one or more mobile computers, a server, and digital data storage accessible by the server. The storage includes records describing automobiles in an inventory, such as vehicle identification numbers (VINs) referenced to automobile site availability and specific features from a set of available automotive features. The mobile computer is programmed to perform machine-executable operations to present a guided, interactive, multimedia presentation of automotive features specific to a subject automobile. One implementation concerns a server and digital data storage containing one or more programs that, when installed and executed, enable a mobile computer to present a guided, interactive, multimedia presentation of automotive features specific to a subject automobile. Another implementation concerns a process of providing an interactive automobile specific presentation of automotive features. Various other implementations are also discussed.

BRIEF DESCRIPTION OF THE DRAWINGS

The description herein makes reference to the accompanying drawings, where like reference numerals refer to like parts throughout the several views, and where.

DETAILED DESCRIPTION

Figure 1:
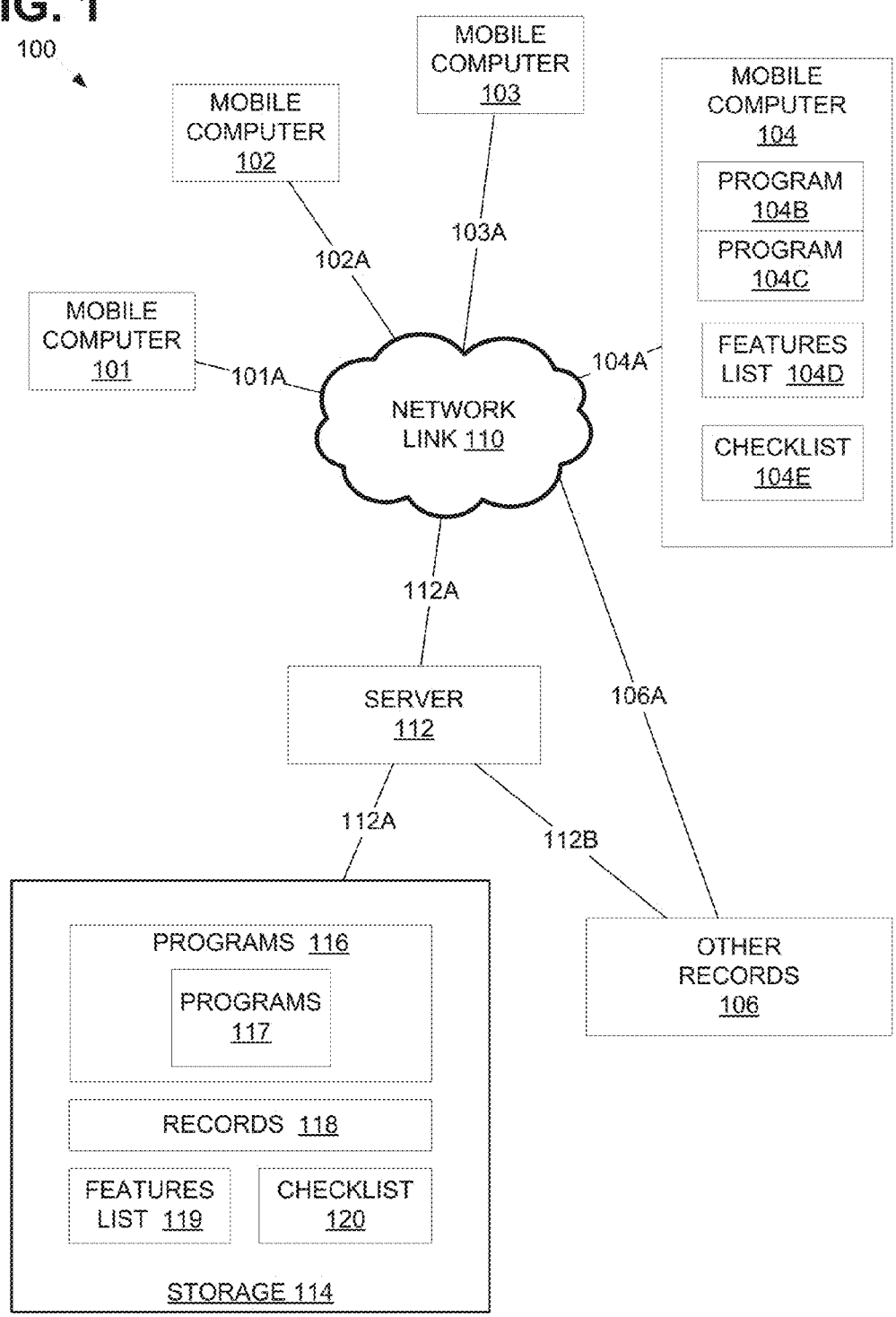
FIG. 1 is a block diagram of an exemplary computer network.

Despite the availability of standardized product literature and web content to explain the makes, models, colors, trim packages, option packages, and other properties of automobiles for sale or lease, the present inventors sought some way to achieve even greater consistency in automobile demonstrations from consultant to consultant, and dealership to dealership. The inventors also sought a way to achieve even greater consistency in the automotive delivery process.

The present inventors recognized that, if greater consistency could be achieved, then there would be numerous benefits. One benefit would be consistently providing the most comprehensive possible explanation of automobile features. Also, the present inventors recognized that achieving a more consistent customer experience from consultant to consultant and dealership to dealership would, over time, help boost customer satisfaction and brand loyalty. Relatedly, the present inventors also recognized that incorporating computers into these processes could even further help to improve consistency and also perform tasks that would simply be impossible to perform by hand.

In this spirit, one implementation of this disclosure concerns a process of providing an interactive automobile specific demonstration presentation, performed with the aid of a computer system including multiple mobile computers and a server having access to multiple stored records storing relating to automobiles in an inventory. The records include, at least, vehicle identification numbers (VINs) cross-referenced to specific automotive features and automobile site availability.

In one implementation, an improved demonstration process helps the customer quickly identify a specific automobile of interest, which is available in on-site inventory. The demonstration process also identifies the features that are present on the subject automobile. Ultimately, the process provides a guided, interactive, multimedia, computer-driven presentation of the identified features, specifically tailored to the specific automotive features present in the subject automobile. A consultant user may employ the guided presentation as a guide for explaining some or all of the specific automotive features in-person to the customer in presence of the desired automobile.

A different implementation of this disclosure concerns a process for providing presentations related to delivery, with the benefits of the same or similar computer system discussed above. This process generates a unit-specific delivery checklist, helps the consultant oversee proper completion of the checklist, and advises the customer of the checklist contents. This process further provides a computer-driven, guided, interactive, multimedia presentation of automotive features present in the delivery automobile. The consultant may employ the guided, interactive presentation as a guide to explain, in-person, the features of interest to the customer user in the presence of the delivery automobile.

The disclosed implementations may be practiced, for example, in the context of the hardware environment 100 of FIG. 1. The environment 100 includes multiple mobile computers 101-104, such as tablet computers, notebook or laptop computers, smart phones, smart watches, wearable computers, or a combination of these or other devices. Although less desirable from the standpoint of convenience, the computers 101-104 may include one or more non-mobile computers such as desktop computers, workstations, mainframe terminals, and the like. The environment 100 also includes a server 112 such as a web server, having access to digital data storage 114 via a link 112a. The link 112a may be a wire, cable, wireless connection, bus, backplane, telephone line, network, or other useful coupling. The server 112 may even be coupled to the storage 114 via a network link 110, described below.

The devices 101-104 and server 112 are interconnected by respective links 101a-104a and 112a, along with a telecommunications network link 110. One example of the network link 112 is the public Internet, and other examples include one or multiple local area networks, wide area networks, Intranets, Extranets, Internetworks, token rings, ad hoc networks, Wi-Fi networks, or any other suitable technology using wires, radiofrequency, microwave, satellite, cellular, optical, or other telecommunications.

The digital data storage 114 includes one or more machine-readable programs 116, and one or more machine-readable computer readable records 118. The storage 114 may also include at least one features list 119 and at least one checklist 120, as discussed in detail below. Optionally, the environment 100 may include one or more instances of additional machine-readable records 106, separate from the storage 114. The records 106 may be coupled to the server 112 via a link 112b or coupled to the network link 110 via a different link 106a. In one example, the records 118/106 may be implemented using one or more relational databases.

Records such as 118/106 may include a variety of data sources. Some examples include OEM and/or third party applications or products such as customer relation management (CRM) applications, dealer management systems (DMS), Dealer Authentication services and Dealer Extranet LDAP, vehicle content and asset services, registration services, authentication services, VinSolutions™ certified preowned (CPO) databases (including CPO inventory, attributes, and photos of CPO inventory), INFINITI™ DealerCenter database (with vehicles, attributes, photos, and new car inventory information), DealerCenter™ Dealer Management software databases (containing new vehicle inventory, marketing descriptions, new vehicle models, packages, accessories), AutoData™ databases (containing marketing descriptions, photos, competitive comparisons), Customer databases (including customer identity, demographics, sales/service history, purchase history), sales lead databases and management services (containing information received via OEM and third party websites and purchases), and such.

In one implementation, some or all of the programs 116 comprise machine-executable wrappers that, when executed, act to install a further program 117 that is, itself, machine-executable. In this context, the further executable programs 117 may be referred to as the payload for the executable wrapper 116.

In practice, the mobile computers initially download one or more wrapper programs 116, exemplified by program 104b in computer 104. When the computer 104 executes the wrapper program 104b, the wrapper program 104b decompresses, decodes, expands, unzips, or otherwise prepares the payload program 104c. The payload program 104c is then executable to provide various enhanced processing features of the computer 104 as described specifically herein. In one example, the program 104c is an IOS or Android application packaged using phone-gap and built using HTML5-Bootstrap-AngularJS. In one implementation, the payload program 104c includes a service layer that delivers Javascript object notation (JSON) APIs for front end consumption. This layer serves as an abstraction layer for seamless migration of the user interface code to different backend systems across regions and platforms.

In addition to programs such as 104b-104c, the mobile computers may also include at least one features list such as 104d and at least one checklist such as 104e, as discussed in greater detail below.

Figure 2:
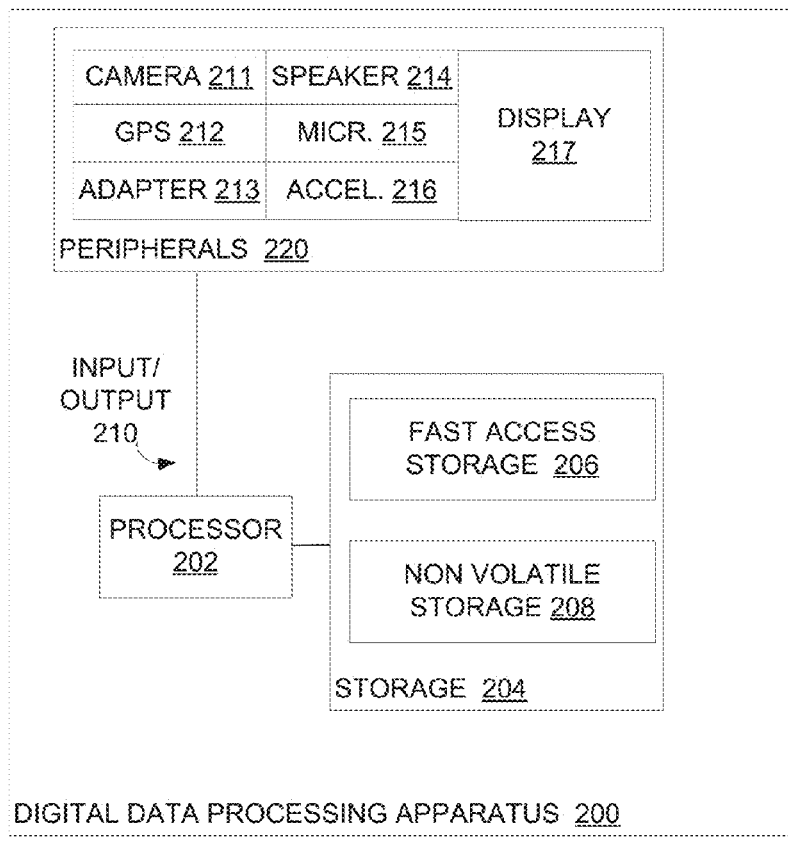
FIG. 2 is a block diagram of an exemplary digital data processing machine.

FIG. 2 is a block diagram of an exemplary digital data processing machine 200. The machine 200 may be used to implement some or all of the digital data processing features of FIG. 1, such as the mobile computers 101-104, server 112, and the like. The machine 200 may be implemented by one or more computing devices such as a mobile telephone, a tablet computer, laptop computer, notebook computer, desktop computer, server, mainframe computer, computer workstation, or a subcomponent or combination of the foregoing.

The exemplary machine 200 includes a processor 202, digital data storage 204, input/output (I/O) 210, and peripherals 220. One example of the processor 202 is a conventional central processing unit. The processor 202 may include single or multiple processors each having single or multiple processing cores. Alternatively, processor 202 may include another type of device, or multiple devices, capable of manipulating or processing information now-existing or hereafter developed.

Figure 3:
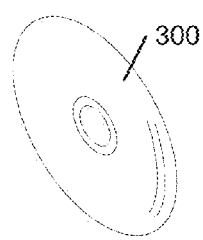
FIG. 3 depicts exemplary digital data storage.

The storage 204 may include nonvolatile storage 208 as well as fast-access storage 206. The storage 204 may comprise one or multiple devices and may utilize one or more types of storage, such as solid state or magnetic. Some examples of storage are specifically given below in the context of FIGS. 3-5 and the related discussion. The storage 204 may include executable instructions and application files along with other data. The executable instructions may include, for example, an operating system and one or more application programs to be loaded in whole or part into the fast-access storage 206 and executed by the processor 202. The operating system may include, for example, WINDOWS®, Mac OS X, Linux, or another operating system suitable to the details of this disclosure. The application programs may include, for example, a web browser, web server, database server, and other such programs. Some further examples of the application files include client/user files, database catalogs, and configuration information.

The I/O 210 may be coupled to various communications and/or peripheral devices as exemplified by 220. Some examples of peripherals 220 include a camera 211, global positioning system (GPS) unit 212, and network adapter 213. The network adapter may provide a wired or wireless network interface. Other contemplated peripherals include at least one speaker 214, microphone 215, accelerometer 216, visual display 217, and other sensors for detecting and/or measuring physical properties. The display 217 may be implemented in various ways, including one or multiple devices such as LCD, CRT, LED, OLED, etc.

Other implementations of the internal architecture of clients and servers are also possible. For example, a server implementation may omit the display 217 as well as client programs such as web browsers. Operations of the processor 202 may be distributed across multiple machines which may be coupled directly or across a local area or other network. Storage 204, 206, and/or 208 may be distributed across multiple machines such as network-based memory or memory in multiple machines performing the operations of clients or servers. Although depicted here as a single bus, the I/O 210 may be composed of multiple buses or even a wireless coupling.

Various instances of digital data storage may be used, for example, to provide the storage 204-208, as well as the storage 114 and 106. Depending upon its application, this digital data storage may be used for various functions, such as storing data and/or storing machine-readable instructions. These instructions may themselves support various processing functions, or they may serve to install a software program upon a computer, where such software program is thereafter executable to perform other processing functions related to this disclosure.

In any case, the storage media may be implemented by nearly any mechanism to digitally store machine-readable signals. One example is random access memory (RAM), which may be used to store executable instructions and data for immediate access by a processor. The RAM may include one or more DRAM modules such as DDR SDRAM. Alternatively, RAM may include another type of device, or multiple devices, capable of storing data for processing now-existing or hereafter developed. Another example of storage media includes optical storage such as CD-ROM, WORM, DVD, digital optical tape, disk storage 300 (FIG. 3), or other optical storage. Another example is direct access storage, such as a conventional "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor may read information from, and write information to, the storage medium. In the alternative, the storage medium may be integral to the processor. In another example, the processor and the storage medium may reside in an ASIC or other integrated circuit.

Figure 4:
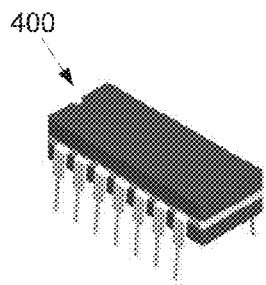
FIG. 4 depicts exemplary logic circuitry.
Figure 5:
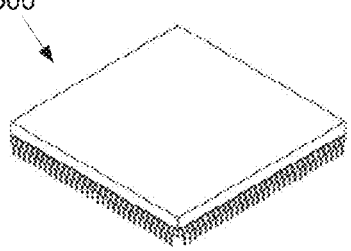
FIG. 5 depicts another example of logic circuitry.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing one or more application-specific integrated circuits (ASICs) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like. FIG. 4 shows an example of logic circuitry at 400. FIG. 5 shows a different example of logic circuitry at 500.

In an implementation, one or more clients or servers or other machines described herein may include an ASIC or programmable logic array such as a FPGA configured as a special-purpose processor to perform one or more of the operations or steps described or claimed herein. An exemplary FPGA may include a collection of logic blocks and RAM blocks that may be individually configured and/or configurably interconnected in order to cause the FPGA to perform certain functions. Certain FPGAs may contain other general or special purpose blocks as well. An exemplary FPGA may be programmed based on a hardware definition language (HDL) design, such as VHSIC Hardware Description Language or Verilog.

Having described some exemplary structural features, some operational aspects of the disclosure will now be described. The steps of any method, process, or algorithm described in connection with the embodiments disclosed herein may be embodied directly in hardware, firmware, software executed by hardware, circuitry, or a combination of these.

Figure 8:
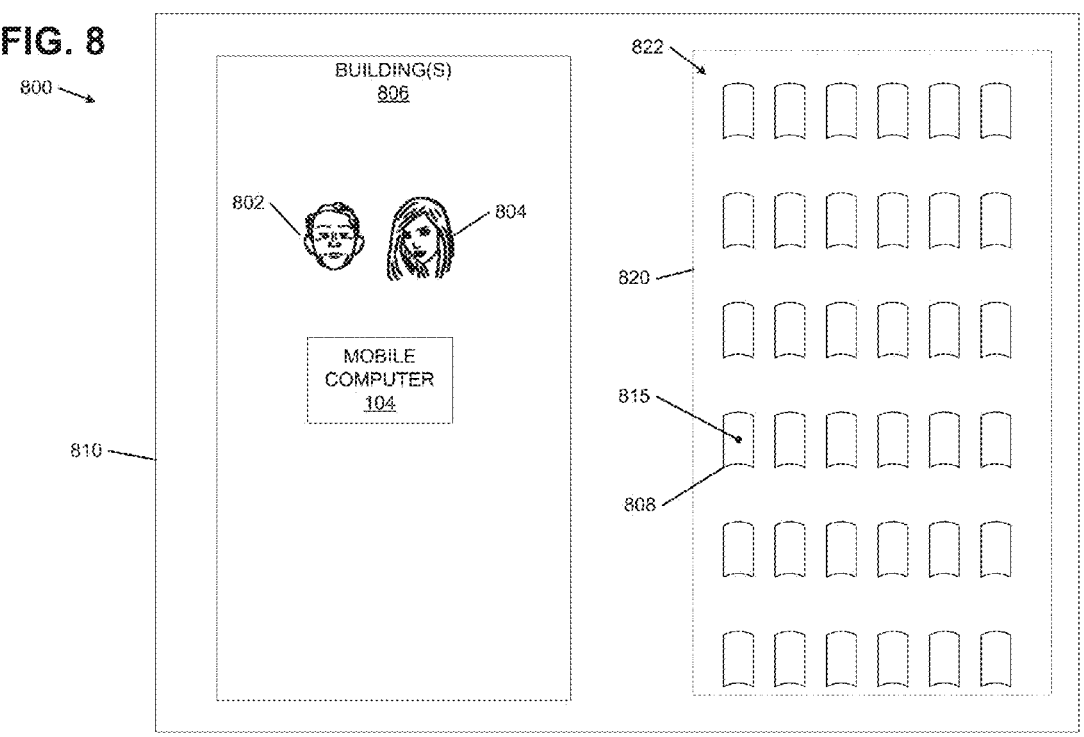
FIG. 8 is a block diagram showing an implementation environment.

In one example, the operational aspects of the disclosure may be practiced in the context of the implementation environment which is illustrated in FIG. 8 and only constitutes one of many potential implementations. This environment 800 includes the premises 800 of an automobile sales facility such as a dealership or vehicle storage lot. The premises 800 includes one or more buildings 806 such as a showroom, offices, service department, parts department, storage, and the like. A consultant 802 and a customer 804 are also illustrated, along with the mobile computer 104 from FIG. 1. The premises 800 further include a parking lot 820 containing an inventory of automobiles 822. Among these automobiles 822 is a specific or "subject" automobile 808 bearing a VIN tag 815.

Figure 6:
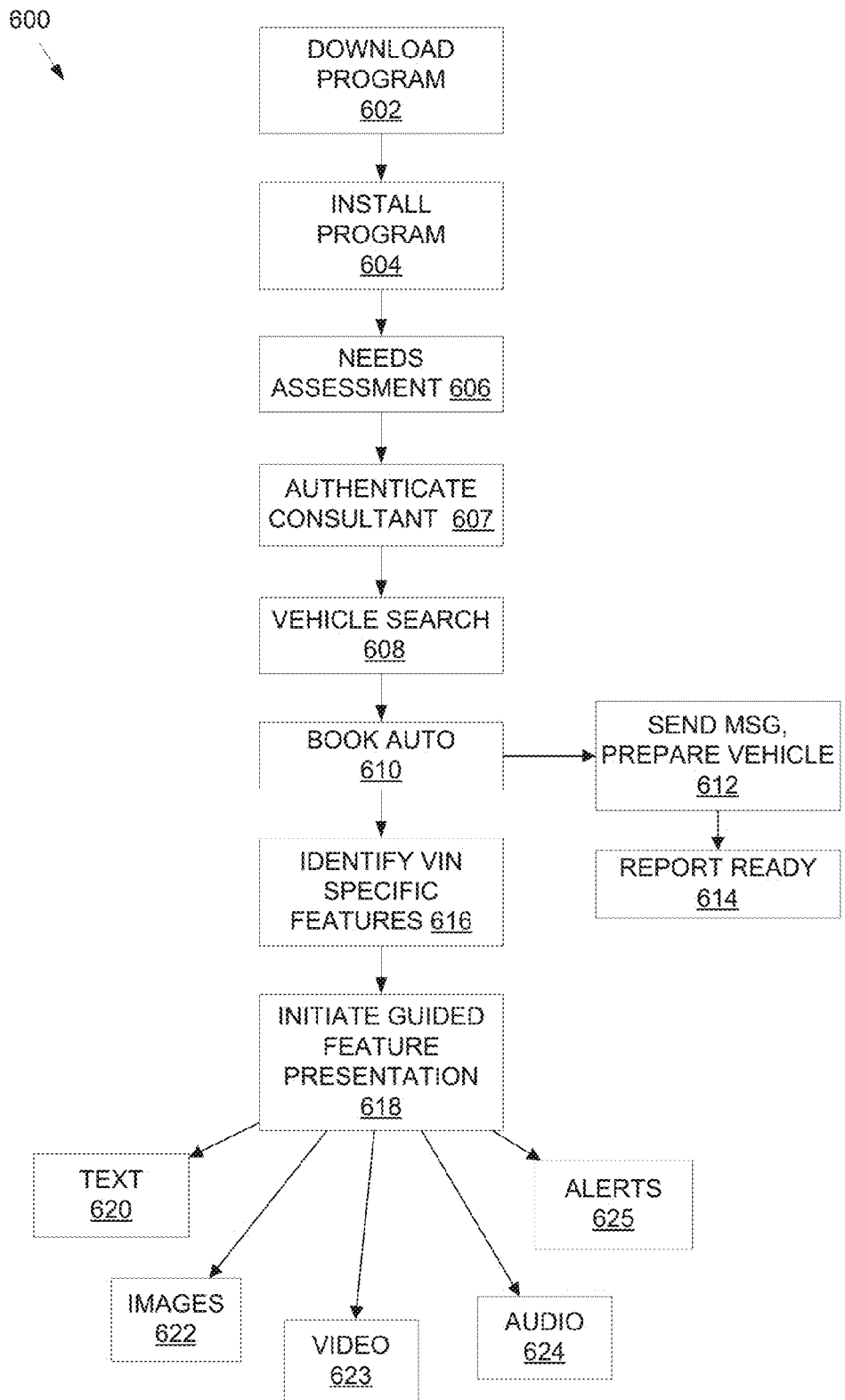
FIG. 6 is a flowchart showing an exemplary process for presenting a guided, interactive, multimedia presentation of automotive features specific to an automobile.

FIG. 6 is a flowchart showing an exemplary process for providing a guided, interactive, multimedia automobile specific demonstration presentation. In one implementation, some or all of the process 600 may be executed using machines and hardware such as the equipment of FIGS. 1-5. In a more particular example, some or all of the process 600 may be performed by components of one or more of the mobile computers 101-104 and the server 112. The illustrated example is given in the context of the mobile computer 104 (FIGS. 1 and 8), without any intended limitation.

For ease of explanation, the process 600 is depicted and described as a series of steps. However, steps in accordance with this disclosure may occur in various orders and/or concurrently. Additionally, steps in accordance with this disclosure may occur with other steps not presented and described herein. Furthermore, not all illustrated steps may be required to implement a method in accordance with the disclosed subject matter.

Broadly, the process 600 concerns a process for providing a guided, interactive, multimedia, demonstration presentation that is specific to a given automobile. The demonstration may, in some cases, include an automotive test drive. According to one implementation, the process 600 begins with steps 602-604. In most cases, steps 602-604 need only be performed once in order to initially configure the computer 104. Referring to FIGS. 1 and 6, in step 602, the mobile computer 104 downloads a prescribed wrapper program 116 via the server 112. The program 116 has a payload 117. The computer 104 stores the wrapper program 116 in local storage as denoted by 104b. In step 604, the computer 104 executes the wrapper program 104b, causing the computer 104 to install the payload program 117. In this example, the installed payload program 117 resides in local storage as denoted by 104c.

In step 606, the consultant 802 conducts a needs assessment with the customer 804. The needs assessment may be conducted with or without the computer 104, for example, by interviewing the customer, having the customer complete a questionnaire, making logical inferences about the customer's automotive requirements, etc. The consultant 802 and/or customer 804 may enter results or highlights of the needs assessment into the computer 104 for later use, as explained below. In a different implementation, the needs assessment may be computer driven 104, as performed by the program 117/104c.

The remaining operations 607-624 are performed by the computer 104 executing the program 104c, with some exceptions as explained below. In step 607, the computer 104 authenticates the consultant 802, who in the context of operating the mobile computer 104, is referred to as a "consultant user." Relatedly, the customer 804, in the context of operating the mobile computer 104, is referred to as a "customer user."

In step 607, authentication of the consultant 802 is conducted according to credentials stored on the computer 104 and/or the storage 114, or elsewhere. Credentials may include, for example, a user name, password, or other indicia of identification. In one example, the consultant may operate the computer 104 to employ its camera (such item 211 of FIG. 2) to scan indicia such as: biometric features; an identification document such as a voter ID card, birth certificate, driver's license, social security card, or other indicia. In one example, scanning may target indicia such as a two dimensional data matrix or bar code, text for subsequent optical character recognition, or another reliable indicator of identity.

Figure 9:
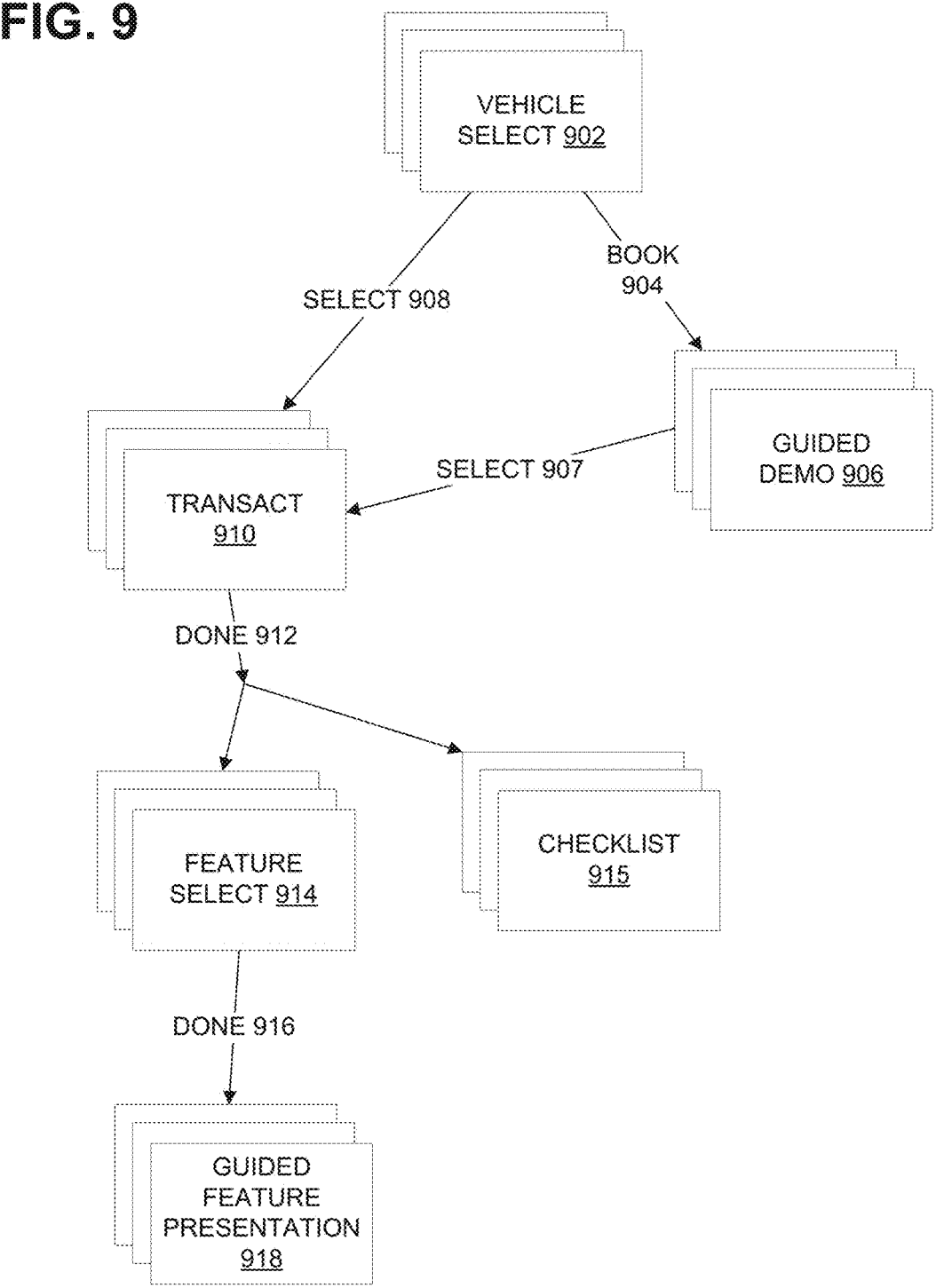
FIG. 9 is a block diagram illustrating the relationship between various display screens.

After step 607, in a consultant user session with the computer 104 and under direction of the consultant user 802, the computer 104 in step 608 presents one or more interactive display screens and ultimately identifies a desired one of various predetermined make-model-package combinations satisfying the customer needs assessment as recorded in step 606. This is conducted using automobile data from records 118/106, for example. Step 608 may further include the computer 104 filtering automobiles listed in the records 118/106 according to the desired make-model-package to identify at least one desired automobile that is available on-site at the premises 810. In the present example, the resultant automobile is denoted by the subject automobile 808. The vehicle selection screens are illustrated in FIG. 9 by reference 902.

In one example of step 608, the computer 104 provides an initial screen (one of the screens 902) that lists automobiles by model classes such as sedans, hybrids, coupes & convertibles, and crossovers & SUVs. Upon selection of given model, a follow up screen 902 displays available trim package within that model. For example, when the consultant user selects an INFINITI brand Q40® automobile, the computer 104 provides a subsequent screen 902 listing trim packages including Q40® and Q40® AWD. Along with each trim package, such as on the same screen 902, the computer 104 may display further related information such as price range, engine specifications, fuel economy, standard features, and the like.

Upon selection of one of the displayed trim packages, the computer 104 displays all automobiles of the selected model and trim package. Optionally, the displayed automobiles may be limited to those that are on-site at the premises 810. Along with displaying the resultant automobiles matching the selected model and trim package, the presentation of automobiles may further include a user-driven filter according to color, interior color, and option package. Some examples of option packages include a moon roof package and a navigation-plus package.

The presently discussed screen 902 may further present follow up options, such as "view details", "book guest drive," and "select vehicle." Selection of "view details" causes the computer 104 to display a photograph of the selected automobile, applicable MSRP, MSRP price breakdown, list of included accessories, list of standard features, color, VIN, engine specifications, drive type, transmission, and the like.

Selection of "select vehicle" 908 causes the computer to lead into a sequence (not shown but represented by screens 910) of operations to negotiate and complete sale of the automobile.

Selection of "book guest drive" 904 instructs the computer 104 to behave according to the following description. Ultimately, after the consultant 802 and customer 804 settle on the automobile 808, the consultant books a demonstration of the automobile 808 in step 610. Here, the consultant 802 operates the computer 104 to submit booking instructions to the server 112. The booking instructions specifically identify the automobile 808, which was identified in step 608.

In response, the server 112 in step 612 transmits a machine-readable notification to one or more vehicle porters on the premises 810. The notification identifies the automobile 808 as being ready for demonstration. The notification may comprise, for example, an email, SMS or other text message, instant message (IM), voicemail, etc. Responding to this message, the vehicle porters in step 612 manually prepare the desired automobile for demonstration. In step 614, the vehicle porters report that the automobile 808 is ready for demonstration, for example, by sending a machine-readable message to the consultant 802. The notification may comprise, for example, an email, SMS or other text message, IM, voicemail, etc.

Also responsive to the booking step 610, the computer 104 in step 616 accesses the records 118/106 or local storage of the computer 104 to identify the features 119/104d present in the automobile 808. In an implementation, the features list is embodied by the list 119, which is pre-prepared and contained in storage 114, or alternatively generated by the server 112 and written to storage 114. In this implementation, the server 112 may transmit the features list 119 to the mobile computer 104 to be stored at 104d. In a different implementation, the mobile computer 104 generates or compiles the features list 104d by referencing stored records of 118/106. Whether prepared or retrieved by the server 112 or the mobile computer 104, the features list 119/104d in one example is obtained by the computer 104 and/or server 112 cross-referencing the VIN 815 against pre-prepared listings of features according to make, model, package, and such. Alternatively, the computer 104 and/or server 112 may compile, assemble, generate, or otherwise formulate the list of features by referencing various ones of the records 118/106.

The feature list 119/104d may include items such as: interior dimensions, interior volume, cargo volume, weight distribution, fuel capacity, EPA estimated fuel economy, engine specifications and special features, on board electronics, interior and exterior lights, remote control, seat configuration and movement and adjustment, winter packages, transmission, suspension, tires and wheels, safety features, and many more.

Having identified the relevant features of the subject automobile, the computer 104 performs step 618. Namely, in the previous consultant user session or a new consultant user session after re-authenticating the consultant user, the computer 104 in step 618 presents a sequence of multiple display screens 906 that provides a guided, interactive presentation of the found features 119/104*d*. Optionally, this presentation may be prioritized, truncated, highlighted, or otherwise customized according to the completed needs assessment from step 606, in the event that the consultant 802 or customer 804 enters results of the needs assessment into the computer 104 or in the event that the computer 104 conducts the needs assessment 606. The demo presentation 618 includes multimedia content, which means that a variety of different forms of media are included such as textual lists 620, images 622, video 623, and audio 624. These are included to explain some or all of the features 119/104*d*. In any case, the presentation is particularly valuable and well suited to the automobile 808 because it is specifically tailored to the enumerated features 119/104*d*, omitting features from irrelevant models and feature packages.

In addition to the multimedia content of 620-624, the presentation 618 may include various alerts 625 in the form of further text or multimedia content specifically linked to relevant stages of the automobile demonstration. For example, some or all of these alerts 625 may be responsive to the GPS sensor 212 of the computer 104 recognizing proximity to a waypoint predefined in the computer 104 or records 118/106. In this example, the alerts 625 direct the computer 104 to automatically explain, or provide opportunities for the computer 104 or consultant 802 to explain, features of the automobile 808 relative to the automobile's location or physical environment. For example, an alert concerning a comfort ride feature may be triggered by proximity to a predefined railroad crossing or uneven road surface waypoint. An alert concerning cornering ability may be triggered by a sharp curve waypoint. An alert concerning vehicle braking may be signaled by a speed zone waypoint, and an alert concerning engine power may be triggered by a highway on-ramp waypoint.

The consultant 802 therefore employs the guided, interactive presentation 618 (including screens 906) as a guide to explain some or all of features 119/104*d* in person to the customer 804 in presence of the automobile 808. In an example, the progression, speed, content selection, order, and other features of the presentation are controlled by the consultant user 802 instructions received at the computer 104.

After completing the guided presentation of step 618 (as shown by screen 906), the computer 104 may present a "select" 907 screen or option, which when activated causes the computer to lead into the aforementioned sequence (not shown but represented by screens 910) of operations to negotiate and complete sale of the automobile. When these transactions 910 are done, as shown by 912, processes are initiated to present an interactive automobile specific delivery checklist in screens 915 and to provide a guided, interactive multimedia presentation of automotive features upon delivery in screens 914, 918.

Figure 7:
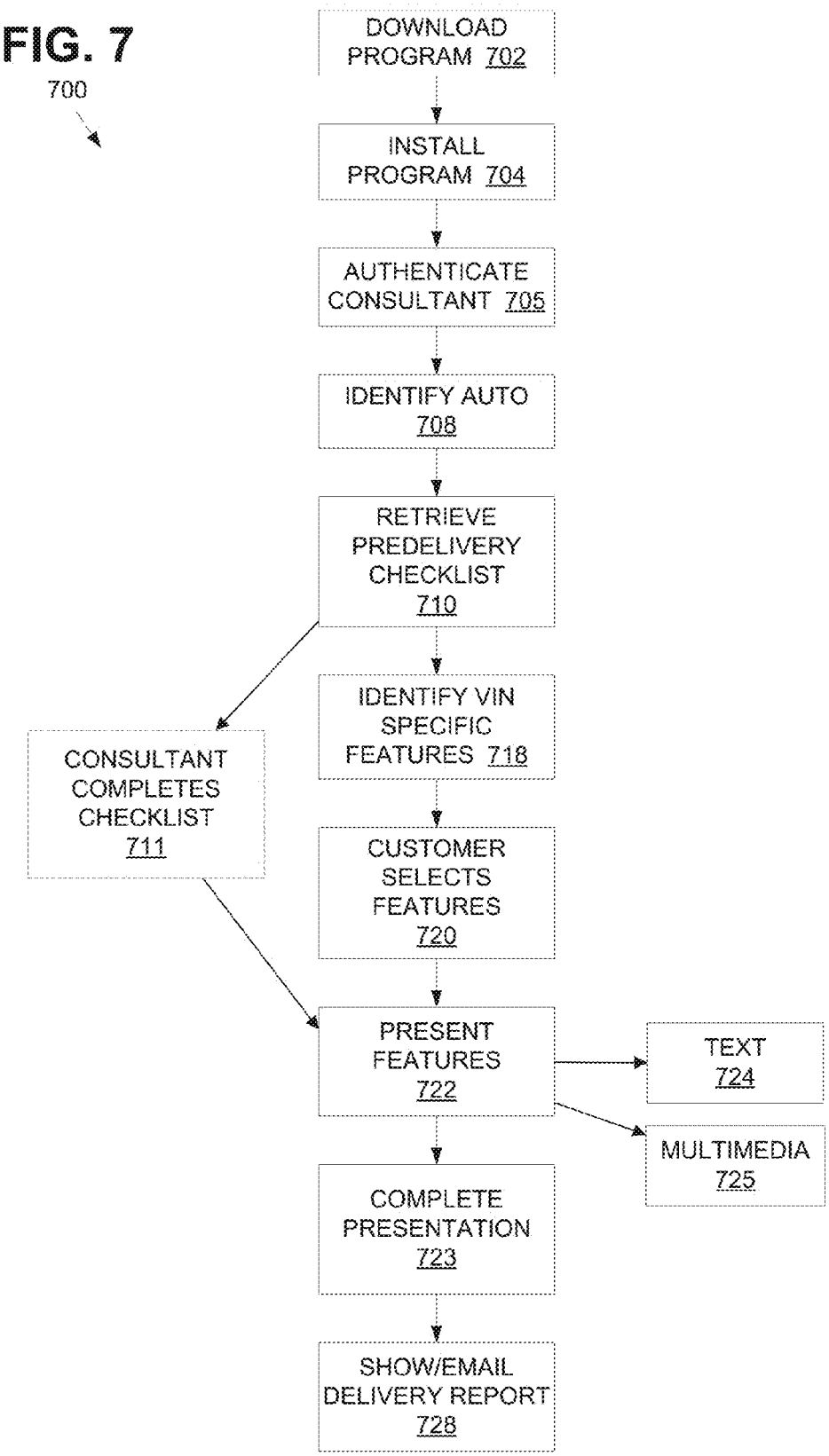
FIG. 7 is a flowchart showing an exemplary process for providing a guided, interactive, multimedia, and automobile specific delivery presentation.

More particularly, in contrast to the pre-delivery demonstration process of FIG. 6, FIG. 7 provides a flowchart showing an exemplary process for presenting an interactive automobile specific delivery checklist and providing a guided, interactive multimedia presentation of automotive features at delivery time. The process 700 is conducted after the customer 804 has purchased the automobile 808, for example via screens 910-912 (FIG. 9).

In one implementation, some or all of the process 700 may be executed using machines and hardware such as the equipment of FIGS. 1-5. In a more particular example, some or all of the process 700 may be performed by components of one or more of the mobile computers 101-104 and the server 112.

For ease of explanation, the process 700 is depicted and described as a series of steps. However, steps in accordance with this disclosure may occur in various orders and/or concurrently. Additionally, steps in accordance with this disclosure may occur with other steps not presented and described herein. Furthermore, not all illustrated steps may be required to implement a method in accordance with the disclosed subject matter.

According to one implementation, the process 700 begins with steps 702-704. These may be conducted in the same manner as steps 602-604, discussed above. If steps 602-604 have been performed previously, steps 702-704 may be skipped. Step 705 conducts authentication of the consultant 802, which occur in a similar manner as step 607 discussed above. In an implementation, the consultant may still be authenticated by a previous iteration of steps from the process 600, in which case step 705 deemed satisfied or skipped.

After step 705, in a consultant user session with the computer 104, the computer 104 in step 708 presents an identification of the automobile 808 to be delivered. For example, the computer 104 may reference the previously demonstrated automobile 808 from step 610 (FIG. 6), and present hyperlinked text or icons in a prominent site on the consultant's login or other screen. Or, the computer 104 may list the automobile 808 in association with a customer record for the customer 804, or another alternative. In another example, step 708 may identify the appropriate automobile by using the computer camera 211 to scan the VIN tag 815 of the automobile 808 or to scan the window sticker (or so-called "Monroney" sticker) of the automobile 808. The computer 104 may automatically sense a night condition based on time or darkness, and activate a flashlight or camera flash integrated or attached to the computer 104 to illuminate the VIN tag 815. The subject automobile may also be identified by having completed a transaction process, such as the screens 910 (FIG. 9).

In step 710, under direction of the consultant 802, the computer 104 consults the records 118/106 to compile, generate, assemble, or otherwise formulate a pre-delivery checklist 104*e* corresponding to the automobile 808 and VIN tag 815. In a different example, the computer 104 receives a pre-delivery checklist 120 that is compiled, generated, assembled, or otherwise formulated by the server 112. In still another example, the computer 104 receives a predefined pre-delivery checklist 120 available from the server 112 or the records 118/106. Alternatively, one or more pre-delivery checklists 104*e* may be stored or cached locally on the computer 104 or integrated into the program 104*c*.

After step 710, the consultant 802 may log-off from the computer 104 and hand the computer 104 to the customer 804, in order for the customer 804 to engage in an interactive feature selection starting in step 718, as described below. This is shown by screens 914 in FIG. 9. More particularly, in one example, the consultant 802 logs off from the computer 104 and uses a different device to review the pre-delivery checklist 120/104*e* (step 711) to enable the consultant 802 to progress through the checklist 120/104e in the presence of the automobile while the customer 804 separately borrows the computer 104 to proceed through a guided feature presentation as discussed below in step 722.

While the customer 804 is so engaged, the consultant 802 readies the automobile 808 in step 711 by completing the items in the checklist 120/104e. Namely, the consultant in step 711 uses the pre-delivery checklist 120/104e shown on screens 915 as a guide to ready the automobile 808 for final delivery to the customer 804. In one example, the screens 915 require the consultant 802 to digitally sign, check off, or otherwise affirm completion of items of the pre-delivery checklist.

At any rate, the checklist 120/104e is customized to the specific automobile 808. The computer 104 presents the checklist 120/104e by providing one or more display screens 915 (FIG. 9) presenting the prescribed checklist list for review by the consultant 802. The checklist may provide radio buttons, check boxes, or other features indicating completion of each item of the checklist. The contents of an exemplary checklist are described in TABLE 1 below.

In one example, the computer 104 numbers the items in the features list, and maintains a running tally of the number of items completed, either in total or within predefined headings or categories. In this example, the computer 104 may require the consultant to complete a given minimum number of pre-delivery checklist items, or certain key items, or a given minimum number within each category in order to deem the checklist complete.

Whenever the consultant 802 logs off, such as after step 710, the computer 104 or the server 112 may save the state, screen, or stage of the program 104c in nonvolatile memory. In this way, when the consultant logs back in (such as step 722 described below), the consultant 804 can resume exactly or near where he/she left off. In a different example, the program 104c may be configured to maintain a paired or tethered relationship between two devices, such as a tablet and a smart phone. In other words, the state is maintained across these devices, so there is a seamless handoff from device to device. Thus, the consultant can pick right up from the same point upon logging into the other one of the paired devices. One advantage of state saving is that the consultant

TABLE 1

EXEMPLARY PRE-DELIVERY CHECKLIST
© Copyright 2015 NISSAN NORTH AMERICA, INC.

Ensure the following has been completed by the service technician:
    Body control module (BCM) transit mode has been canceled.
    Verify telematics communication unit (TCU) has been activated.
    Battery check was performed.
    Paint guard film (PGF) has been removed and residue lines are clean.
    Windshield wiper covers have been removed.
    Wheel protector covers have been removed, if applied.
    Brake rotors have been inspected for cosmetic corrosion.
    Pressure of all tires has been checked and adjusted to placard.
    Door panel, seat covers, sill plate, and steering wheel protection have been removed.
    Door trim panels are not damaged by the protector attaching straps during the removal process.
    Exterior of vehicle was washed.
Review all key documents and verify that all manuals and guides are available during client delivery, including:
    Owner's manuals.
    Service and maintenance guide.
    Warranty information booklet.
    Client care/Lemon law information booklet.
    Quick reference guide.
Conduct interior and exterior inspection.
    Vehicle interior is clean and in showroom condition.
    Vehicle exterior is clean and in showroom condition.
    If not a state mandate, ask if client would like the front license plate bracket attached at delivery. Advise client that hardware is in the vehicle.
Prepare for customer delivery.
    There is a full tank of gas.
    A special location is secured to perform your new vehicle delivery.
    Retailer accessories are installed. If not applicable, select "Completed."
Complete INFINITI ® services enrollment
    Enroll client in INFINITI ® personal assistant and install the companion app on client's smartphone.
    Enroll client in INFINITI CONNECTION ® program (if equipped) and install the companion app on client's smartphone.
    Install the INFINITI INTOUCH ™ companion app (if equipped) on client's smartphone and either sign in (if there is an existing account) or create account.
    Follow steps in the app(s) to complete enrollment.
Ensure a personalized and memorable new vehicle delivery.
    Walk customer through the service department.
        Introduce the customer to staff.
        Ensure the customer is aware of service land procedures.
        Show the customer where to order parts, accessories, and merchandise.
        Show the customer all electronic tools available to book appointments.
    Connect applicable technology.
        Pair a customer's phone to Bluetooth.
        Upload the customer's address book.
        Ensure mapping software is installed, if vehicle is equipped with navigation.
    Provide a unique gift or token of your appreciation.

802 can enter into the processes 700-800 at different points depending on consultant preferences, client needs, and the specific situation.

As mentioned above, step 718 begins an interactive feature selection for the customer user. Optionally, in step 718 the customer 804 may be authenticated using similar techniques as explained above in conjunction with authenticating the consultant 802. In step 718, during the customer session, the computer 104 accesses the records 118/106 or local storage of the computer 104 to identify the features 119/104*d* present in the automobile 808. In an implementation, the features list is embodied by the list 119, which is pre-prepared and contained in storage 114, or alternatively generated by the server 112 and written to storage 114. In this implementation, the server 112 may transmit the features list 119 to the mobile computer 104 to be stored at 104*d*. In a different implementation, the mobile computer 104 generate, compiles, or retrieves the features list 104*d* by referencing stored records of 118/106.

Having identified the relevant features of the subject automobile, the computer 104 in step 720 presents one or more display screens 914 (FIG. 9) listing the identified specific automotive features 119/104*d* of the automobile 808 for the customer 804. Further in step 720, the computer 104 receives the customer 804's input indicating which features are "of interest" to the customer 804. Feature selection may provide radio buttons, check boxes, or other features indicating whether each item is of interest to the customer 804. TABLE 2, below, illustrates contents of an exemplary feature list from step 720, provided for the customer to select features of interest. Instances of "<learn more>" and "<show video>" provide links to additional text and/or multimedia content relating to feature descriptions.

TABLE 2

EXEMPLARY FEATURE SELECTION LIST
© Copyright 2015 NISSAN NORTH AMERICA, INC.

We have pre-selected these key features for demonstration.
    Interior Features.
        Dual occupant memory system for driver's seat, mirrors, and steering wheel
        settings, linked to individual intelligent keys.
    Audio and Entertainment System
        6-speaker audio system, AM/FM/CD with MP3 playback capability, Radio Data
        System (RDS) and speed-sensitive volume.
        SiriusXM satellite radio.
        Steering wheel-mounted audio controls.
        USB connection port for iPod ® interface and other compatible devices.
    Comfort and Convenience
        Cruise control with steering wheel mounted switches.
        Front and rear sonar system. <learn more>
        Around View ® monitor with moving object detection. Moving object detection
        provides visual and audible warnings if a moving object is detected within the
        displayed around view monitor image.
        Bluetooth hands-free phone system.
        Dual zone automatic temperature control (ATC) system.
        INFINITI ® controller for audio, climate-control, fuel economy, maintenance, and
        comfort and convenience features.
        INFINITI ® navigation system. The touch-screen hard drive navigation system
        features INFINITI ® voice recognition and NavTraffic, which includes detailed
        traffic information. The high-resolution screen supports Birdview ™ perspective
        control and enhanced 3-D building graphics. Together, these features enhance
        your journey and help you navigate while Lane Guidance indicates the correct
        lane to be in when approaching an interchange or exit. You can also access
        current weather updates and 3-day forecasts using NavWeather.
        INFINITI ® voice recognition. INFINITI ® voice recognition, part of the
        navigation system, recognizes the natural inflections in your voice and lets you
        control cell phone functions with the vehicle's Bluetooth hands-free phone
        system, as well as many functions of the INFINITI ® hard drive navigation
        system. All without moving your eyes from the road or your hands from the
        wheel.
        NavTraffic. With NavTraffic, enjoy detailed information display of traffic flow,
        roadwork and accidents, so you can plan the right route. With easy-to-read
        incident icons that indicate specific traffic events or hazards ahead and suggested
        alternate routes to best avoid delays, the system is a time-saving resource.
        NavWeather. Access current weather updates with NavWeather. Current
        conditions, storm warnings, a 3-day forecast, and more are provided by the
        service through the INFINITI ® hard drive navigation system.
    Drivetrain
        Infiniti Drive Mode Selector allows driver to choose between standard, sport,
        snow, or eco mode and controls throttle responses and transmission shift points.
        <show video>
        3.7 liter (3.969 cc) 24 valve V6, aluminum alloy block and heads.
        Electronically controlled 7 speed automatic and adaptive shift control (ASC).
        Driver adaptive learning algorithm senses driving style and adjusts automatic
        shifting accordingly. Manual shift mode offers sequentially selectable manual
        gearshifts and downshift rev matching. <show video>
        Hill start assist. <learn more> <show video>

TABLE 2-continued

EXEMPLARY FEATURE SELECTION LIST
© Copyright 2015 NISSAN NORTH AMERICA, INC.

Exterior Features
    Automatic trunk closure assist cincher.
    Emergency inside trunk release.
    INFINITI ® intelligent key with illuminated push button ignition.
    Remote keyless entry system with selective unlocking of driver's door or all
    doors.
    T165/80R17, or with sport packages and performance tire and wheel package,
    T155/80R18. This is the spare tire in your vehicle. Sales consultant can show
    you location of spare tire and tools.
    Valet key and trunk lockout feature
Interior Features
    10-way power driver's and front passenger's seats.
    Auto-dimming inside mirror with HomeLink ® universal transceiver.
    Climate-controlled front seats. <learn more>
    Front armrest with dual-level storage compartment, 12-volt power outlet,
    auxiliary input jacks and USB connection port.
    Front sun visors with illuminated vanity mirrors with extension.
    Heated steering wheel. <learn more>
    LATCH system (lower anchors and tethers for children) helps simplify proper
    installation of compatible child restraint seats. <learn more> <show video>
    Power door locks with automatic locking feature.
    Power sliding tinted glass moon roof with one-touch auto-open/close, tilt feature,
    and sliding sunshade.
    Power tilt and telescopic steering column.
    Power windows with illuminated switches and one-touch auto-up/down with
    auto-reverse feature.
    Rear-seat center armrest with storage.
    Sequential welcome lighting illuminated entry system.
Instrumentation and Controls
    Automatic on-off LED headlights with wiper interlock.
    Power folding, heated, auto-dimming outside mirrors with reverse tilt down
    feature.
    Rain sensing, variable intermittent front windshield wipers.
    Tire pressure monitoring system (TPMS) provides specific information for each
    tire and low pressure warning.
Safety features
    Vehicle dynamic control (VDC). <show video>
Other
    Auto hazard warning signal turns on the hazard lights in the event of the air bags
    being deployed.
    Battery saver helps present accidental discharging if electrical accessories are left
    on.
    Vehicle security system.

When feature selection 720 concludes, the computer 104 may optionally lock out the customer 804 from some or all features of the program 104c. In an example, the computer 104 may still provide selected functionality to the customer user, such as operating a web browser. At this point, the feature selection of screens 914 (FIG. 9) is finished, as shown by 916 (FIG. 9).

After step 720, the customer 804 hands the computer 104 back to the consultant 802 in order for the consultant 802 to initiate step 722. Here, while the consultant 802 is engaged in a consultant user session with the computer 104, the computer 104 presents one or more display screens 918 (FIG. 9) containing a guided presentation of certain of the features 119/104d, emphasizing or limited to those features found to be of interest to the customer 804 in step 720. The presentation of step 722 may include text 724 as well as multimedia content 725 such as audio, images, and video. TABLE 3, below, illustrates an excerpt of an exemplary guided feature presentation in accordance with step 722 and screens 918. The presentation may provide radio buttons, check boxes, or other features indicating completion of each item of the presentation.

TABLE 3

EXCERPT OF GUIDED FEATURE PRESENTATION
© Copyright 2015 NISSAN NORTH AMERICA, INC.

Interior Features (0/1 completed)
    Dual occupant memory system for driver's seat, mirrors, and steering wheel settings,
    linked to individual intelligent keys.
        Store desired driver settings in memory buttons, if equipped.
        Link the key fob to the stored memory settings.
Audio and Entertainment system (0/1 completed)
   6-speaker audio system, AM/FM/CD with MP3 playback capability, Radio Data System
   (RDS) and speed-sensitive volume.
      Show customer settings for sound direction.
      Have device readily available to show the operation.
      Store customer presets.
      For certain vehicles with Nav be sure the VIN-specific SD card is in place before
      storing presets. If not in place the presets will not be stored.

TABLE 3-continued

EXCERPT OF GUIDED FEATURE PRESENTATION
© Copyright 2015 NISSAN NORTH AMERICA, INC.

Comfort and Convenience (0/8 completed)
    INFINITI ® navigation system.
        Set up customer's preferred map view if available.
        Set customer presets.
        Show all ports for media source.
        Ask customer for permission to add home location.
        Verify VIN-specific SD card is in place.
    INFINITI ® voice recognition.
        Show customer all functions operational by voice.
        Minimize voice feedback.
        Direct customer to perform voice adaption (if available).
    NavTraffic
    NavWeather
    Around View ® monitor with moving object detection.
        Show customer the various camera angles and set customer's preferred
        default angle.
    Dual zone automatic temperature control (ATC) system.
        Show customer all HVAC modes and explain in which environmental
        scenario any automatic mode would occur.
        Explain defrost and defog operation, including air recirculation button.
    Bluetooth hand-free phone system.
        Connect customer's phone.
        Confirm successful phonebook download.
        Voice tagging.
        Identify microphone location.
        Voice dialing a phonebook contact.
        Dialing a number.
        Receiving and ending a call.
        Voice prompt interrupt.
        Minimize voice feedback.
    INFINITI ® controller for audio, climate-control, fuel economy, maintenance, and
    comfort and convenience features.
Drivetrain (0/1 completed)
  Infiniti Drive Mode Selector allows driver to choose between standard, sport, snow, or
  eco mode and controls throttle responses and transmission shift points.
    Explain what engine/transmission variables are changed with each drive mode.
    <show video>
Why service here (0/1 completed)
  Complimentary car wash.
  Advanced diagnostics
  INFINITI ® trained technicians.
Please sign below to confirm delivery of your INFINITI ® automobile.
    ☐(consultant) Yes, I certify that all items have been reviewed and verified with the
    customer. (I have inspected the vehicle, reviewed the pre-delivery inspection checklist,
    new vehicle delivery checklist, and printed quick reference guide with the customer, and
    verified that the actions checked have been performed, including providing the customer
    with a full tank of gas and the state required pre-sale disclosure information. I understand
    that INFINITI ® is relying upon the acknowledgement as evidence for reimbursement of
    my dealership for the cost of the full tank of gas.)
    ☐(customer) Yes, I was given the ability to select the features I wanted to learn
    about. (I have inspected the vehicle and acknowledge all items of the pre-delivery
    inspection checklist, new vehicle delivery checklist, and printed quick reference guide
    have been reviewed with me, including verifying that I have received the full tank of gas
    and the state required pre-sale disclosure information. I have thoroughly inspected the
    entire vehicle and verified that the interior and exterior or the vehicle are in showroom
    condition.)

In step 723, the presentation of features is completed. In one example, having provided one or more display screens (included in 918) showing a summary of the features presented in step 722, the computer 104 provides an opportunity for the customer 804 to digitally sign or otherwise acknowledge the presentation. This may include checkboxes as shown in TABLE 3 along with screen regions for receiving signature input.

In step 728, the computer 104 may store or archive the completed and acknowledged presentation at the computer 104 or another storage such as 118/106 and thereafter send an email or other electronic copy of the acknowledged presentation to persons including at least the customer 804. Along with this email, the computer 104 and/or server 112 may include further product literature such as a digital operating manual and the like.

The consultant 802 therefore employs the guided presentation 712 as a guide to explain some of the features 119/104*d*, and namely those being of interest to the customer 804, this presentation being made in-person to the customer 804 and in the presence of the automobile 808.

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A computer-implemented system for delivering a guided presentation of automotive features, comprising:
   a server comprising:
   a data storage accessible by the server, the data storage comprising:
      automotive records describing automobiles in an inventory, said records including vehicle identification numbers (VINs) referenced to automobile site availability and automotive features from a set of available automotive features; and
      waypoints records, wherein some of the automotive features are relevant to respective some of the waypoints; and a mobile computer,
   the computer-implemented system is configured to execute instructions to:
      present, by the mobile computer, interactive display screens to iteratively identify a desired make-model-package combination satisfying a preestablished customer needs assessment;
      select, by the server and based on the desired make-model-package, from the automobiles listed in the records of the digital data storage, a desired automobile available at a desired physical site, the desired automobile having a VIN;
      generate, by the server and for display at the mobile computer, an interactive presentation of available automotive features that are present in the desired automobile by configuration to:
         identify, by the server, using the VIN and in the automotive records, those of the available automotive features that are present in the desired automobile;
         receive, by the server from the mobile computer, a GPS location of the mobile computer;
         identify, by the server in the waypoints records, proximal waypoints to the mobile computer, the proximal waypoints are identified using the GPS location of the mobile computer and the available automotive features; and
         include, by the server and in the interactive presentation, an alert for an automotive feature present in the desired automobile, the alert relating an identified automotive feature to a waypoint, wherein the alert relates to a respective available automotive feature and is included in the presentation with the presentation of the respective available automotive feature; and
      present, by the mobile computer, the interactive presentation.

2. The system of claim 1, wherein to identify, using the VIN and by the server, in the automotive records those of the available automotive features that are present in the desired automobile comprises to: retrieving a preestablished assembling assemble a list of the identified features by referencing multiple separate data sources listing different features present in the desired automobile.

3. The system of claim 1, where the waypoints comprise: railroad crossings, uneven road surfaces, road curves, speed zones, on-ramps, tunnels, highways, and city streets.

4. The system of claim 1, wherein the computer-implemented system is further configured to execute instructions to:
   receive, by the mobile computer, from a camera of the mobile computer a scan of a physical vehicle identification number (VIN) tag; and
   the given mobile computer checking check, by the mobile computer, whether the scanned VIN tag matches that VIN, the VIN exclusively associated with the desired automobile.

5. The system of claim 1, wherein the mobile computer is further configured to:
   authenticate a consultant user by using a camera of the mobile computer to scan machine-readable indicia visible upon an identification medium.

6. The system of claim 1, further comprising:
   computer configured to interchangeably perform the instructions of the mobile computer.

7. The system of claim 1, where the mobile computer is further configured to:
   authenticating authenticate a consultant user to open a consultant user session;
   storing a state of the consultant user session; and
   responsive to authentication of the consultant user on a different mobile computer than the mobile computer or in a new consultant user session with the mobile computer, resuming the consultant user session at the stored state.

8. The system of claim 1, further configured to:
responsive to the mobile computer receiving predefined input from a consultant user, transmit machine-readable instructions for vehicle porters to ready the desired automobile for demonstration.

9. A computer-implemented system for delivering a guided presentation of automotive features, comprising:
a plurality of mobile computers;
digital data storage accessible by a server, the digital data storage having stored thereon machine-readable automotive records describing automobiles in an inventory, said records including vehicle identification numbers (VINs) referenced to automobile site availability and specific automotive features from a set of available automotive features; and
waypoints records, wherein some of automotive features are relevant to respective some of the waypoints;
where each of the mobile computers is programmed to perform machine-executed operations comprising:
with a processor presenting one or more interactive display screens to iteratively identify a desired make-model-package combination satisfying a preestablished customer needs assessment;
with a processor filtering automobiles listed in the automotive records according to the desired make-model-package to identify a one desired automobile available at a desired physical site, the desired automobile having a VIN;
with a processor consulting the automotive records to identify those of the available automotive features that are present in the desired automobile, said identified features omitting those of the available automotive features absent from the desired automobile; and
with a processor presenting multiple display screens containing a guided, interactive presentation of automotive features, where
the presentation includes multimedia content explaining at least some of the identified automotive features,
the presented automotive features are limited to the identified automotive features, and
the presentation includes alerts related to at least some of the identified automotive features, the alerts identified by instructions to:
identify, by the server, using the VIN and in the automotive records, those of the available automotive features that are present in the desired automobile;
receive, by the server from one of the mobile computers, a GPS location of the one of the mobile computers;
identify, by the server in the waypoints records, proximal waypoints to the mobile computer, the proximal waypoints are identified using the GPS location of the mobile computer and the available automotive features; and
include, by the server and in the interactive presentation, an alert of the alerts, the alert relating an identified automotive feature to a waypoint, wherein the alert is displayed in the presentation at a time of displaying multimedia content for the identified automotive feature.

10. The system of claim 9, where the mobile computers are programmed such that the operation of consulting the automotive records to identify those of the available automotive features that are present in the desired automobile comprises:
retrieving a preestablished list associated with the desired automobile assembling a list of the identified features by referencing multiple separate data sources listing different features present in the desired automobile.

11. The system of claim 9, where the waypoints comprise: railroad crossings, uneven road surfaces, road curves, speed zones, on-ramps, tunnels, highways, and city streets.

12. The system of claim 9, where the mobile computers are programmed such that the operations further comprise a given mobile computer employing a camera of a given mobile computer to scan a physical vehicle identification number (VIN) tag, and the given mobile computer checking whether the scanned VIN tag matches a VIN exclusively associated with the desired automobile.

13. The system of claim 9, where the mobile computers are programmed such that the operations further comprise a given mobile computer authenticating a consultant user by using a camera of the given mobile computer to scan machine-readable indicia visible upon an identification medium.

14. The system of claim 9, where the mobile computers are programmed such that the operations further comprise:
a given mobile computer authenticating a consultant user to open a consultant user session, the given mobile computer causing storage of a state of the consultant user session, and responsive to authentication of the consultant user on a different mobile computer than the given mobile computer or in a new consultant user session with the given mobile computer, resuming the consultant user session at the stored state.

15. The system of claim 9, where the mobile computers are programmed such that the operations further comprise:
responsive to receiving predefined input from a consultant user, initiating transmission of machine-readable instructions for vehicle porters to ready the desired automobile for demonstration.

16. A process of providing an interactive automobile specific presentation of automotive features, performed in a computer system including multiple mobile computers and a server with access to digital data storage containing records describing automobiles in an inventory, said records including vehicle identification numbers (VINs) referenced to automobile site availability and specific automotive features from a set of available automotive features, the process comprising operations of:
a first one of the mobile computers authenticating a predefined consultant user, and in a consultant user session, the first mobile computer performing operations comprising:
with a processor responsive to consultant user input, presenting one or more interactive display screens to iteratively identify a desired make-model-package combination satisfying a preestablished customer needs assessment;
with a processor filtering automobiles listed in the records according to the desired make-model-package to identify a desired automobile available at a desired physical site, the desired automobile having a VIN;
with a processor responsive to consultant user input, initiating submission of machine-readable instructions to the server to schedule an appointment relating to the desired automobile;

responsive to receiving said instructions to schedule an appointment, the server performing operations comprising: displaying or initiating sending of machine-readable instructions for vehicle porters to ready the desired automobile for demonstration;

the first mobile computer or the server consulting the records to identify those of the available automotive features that are present in the desired automobile, said identified features omitting features absent from the desired automobile; and in the consultant user session or in a new consultant user session initiated after re-authenticating the consultant user, the first mobile computer or a different mobile computer performing operations comprising: presenting multiple display screens containing a guided, interactive presentation of automotive features, where the presentation includes multimedia content explaining at least some of the identified automotive features, the presented automotive features are limited to the identified automotive features, and the presentation includes alerts related to at least some of the identified automotive features, the alerts identified by instructions to:

identify, by the server, using the VIN and in the automotive records, those of the available automotive features that are present in the desired automobile;

receive, by the server from one of the mobile computers, a GPS location of the one of the mobile computers;

identify, by the server in waypoints records, proximal waypoints to the mobile computer, the proximal waypoints are identified using the GPS location of the mobile computer and the available automotive features; and include, by the server and in the interactive presentation, an alert of the alerts, the alert relating an identified automotive feature to a waypoint, wherein the alert is displayed in the presentation at a time of displaying multimedia content for the identified automotive feature.

17. The process of claim 16, the operations further comprising: the mobile computer receiving at least one machine-readable message notifying the consultant user that the desired automobile is ready for demonstration.

18. The process of claim 16, the operations further comprising: responsive to the first mobile computer receiving a machine-readable record of the customer needs assessment, the first mobile computer prioritizing or truncating the guided interactive presentation of automotive features according to the customer needs assessment.

* * * * *